United States Patent [19]

Koike et al.

[11] Patent Number: 5,352,752
[45] Date of Patent: Oct. 4, 1994

[54] ROOM TEMPERATURE CURABLE COMPOSITION

[75] Inventors: Noriyuki Koike, Yoshii; Shinichi Sato, Annaka, both of Japan

[73] Assignee: Shin-Etsu Chemical Co., Ltd., Tokyo, Japan

[21] Appl. No.: 193,864

[22] Filed: Feb. 9, 1994

[30] Foreign Application Priority Data

Feb. 9, 1993 [JP] Japan ................................. 5-044672

[51] Int. Cl.$^5$ ..................... C08F 283/04; C08G 77/04
[52] U.S. Cl. ........................................ 528/26; 528/42
[58] Field of Search ..................... 528/26, 42; 556/419

[56] References Cited

U.S. PATENT DOCUMENTS

| | | | |
|---|---|---|---|
| 4,882,396 | 11/1989 | Nagaoka et al. | 528/26 |
| 5,208,312 | 5/1993 | Boutevin et al. | 528/42 |
| 5,288,829 | 2/1994 | Takago et al. | 528/42 |

FOREIGN PATENT DOCUMENTS 1040527  2/1989  Japan ..................... 528/27

Primary Examiner—Melvyn I. Marquis
Assistant Examiner—Helen F. Lee
Attorney, Agent, or Firm—Oblon, Spivak, McClelland, Maier & Neustadt

[57] ABSTRACT

A room temperature curable composition comprises a fluorine-containing organosilicon compound represented by the general formula:

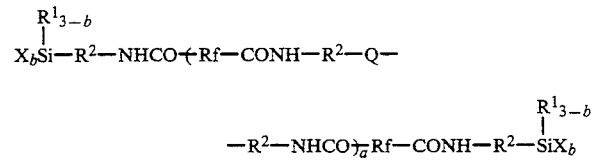

wherein a is an integer of at least 1, b is 2 or 3, each $R^1$ is a monovalent unsubstituted or substituted hydrocarbon group, each $R^2$ is a divalent hydrocarbon group, each $R_f$ is a divalent perfluoroalkylene group or a divalent perfluoroalkylether group, and Q is a divalent siloxane group (—Si—O—Si) having four pendant monovalent hydrocarbon groups bonded to silicon atoms. The composition can provide a cured product excellent in all of the solvent resistance, chemical resistance, heat resistance and cold resistance.

10 Claims, No Drawings

ROOM TEMPERATURE CURABLE COMPOSITION

BACKGROUND OF THE INVENTION

1. Field of the Invention

The present invention relates to a room temperature curable composition that can be cured readily by action of moisture, and particularly to a room temperature curable composition that can provide a cured product having excellent solvent resistance, chemical resistance, heat resistance and cold resistance.

2. Description of the Prior Art

Hitherto, there is known a so-called room temperature curable composition that is preserved stably with fluidity under hermetic sealed conditions but cured to form a rubber-like elastomer at room temperature by action of atmospheric moisture. Such a curable composition is widely used as sealants, coating materials, adhesives and the like in the fields of building industry, machine industry and electric industry.

However, any known room temperature curable compositions can not provide a cured product that is excellent in all the characteristics of solvent resistance, chemical resistance, heat resistance and cold resistance. For example, room temperature curable organopolysiloxane compositions can provide a cured product excellent in heat resistance and cold resistance, but the cured product is unsatisfactory in solvent resistance and chemical resistance. Further, the cured products of other room temperature curable compositions have poor heat resistance.

SUMMARY OF THE INVENTION

Thus, an object of the present invention is to provide a room temperature curable composition that can produce a cured product excellent in all of the solvent resistance, chemical resistance, heat resistance and cold resistance.

The present invention provides a room temperature curable composition comprising a fluorine-containing organosilicon compound represented by the following general formula (1):

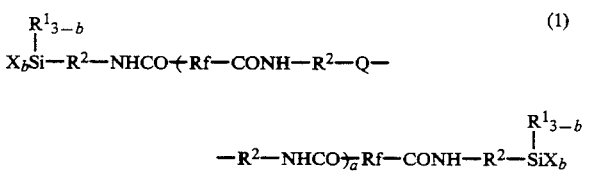

wherein a is an integer of at least 1, b is 2 or 3, $R^1$, which may be the same or different where plural $R^1$ are present, is a monovalent unsubstituted or substituted hydrocarbon group, the plural $R^2$ may be the same or different and are each a divalent unsubstituted or substituted hydrocarbon group, the plural X may be the same or different and are each an alkoxy group or an alkenyloxy group, the plural $R_f$ may be the same or different and are each a divalent perfluoroalkylene group or a divalent perfluoroalkylether group, and Q is a siloxane group expressed by the following formula (2):

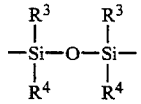

where the plural $R^3$ and $R^4$ may be the same or different and are each a monovalent unsubstituted or substituted hydrocarbon group.

DETAILED DESCRIPTION OF THE INVENTION

Base component

The curable composition of the present invention comprises a fluorine-containing organosilicon compound represented by the general formula (1) as the base component. The fluorine-containing organosilicon compound has plural hydrolyzable groups (alkoxy groups or alkenyloxy groups) at each terminal end of the molecular chain, which hydrolyze and condense in contact with atmospheric moisture, so that the composition is cured to form a cured product of rubber-like elastomer.

In the general formula (1), the monovalent unsubstituted or substituted hydrocarbon group $R^1$ includes, for example, an alkyl group such as methyl, ethyl and propyl; a cycloalkyl group such as cyclohexyl; an alkenyl group such as vinyl, allyl, and isopropenoxy; an aryl group such as phenyl and tolyl; an aralkyl group such as benzyl and phenylethyl; and corresponding substituted groups in which a part or all of the hydrogen atoms in the above-described groups are substituted by a halogen atom or the like, such as 3,3,3-trifluoropropyl, 6,6,6,5,5,4,4,3,3-nonafluorohexyl chloromethyl and 3-chloropropyl. In the present invention, the $R^1$ is preferably a hydrocarbon group having 1 to 8 carbon atoms, and most preferably a methyl group, a phenyl group or a 3,3,3-trifluoropropyl group.

The divalent unsaturated or saturated hydrocarbon group $R^2$ may be, for example, an alkylene group such as methylene, ethylene, propylene and butylene; an arylene group such as phenylene and tolylene; or corresponding substituted groups in which a part or all of the hydrogen atoms in the above-described groups are substituted by a halogen atom or the like. In the present invention, the $R^2$ is preferably a hydrocarbon group having 1 to 8 carbon atoms, and most preferably an ethylene group or a propylene group.

Furthermore, the X is an alkoxy group or an alkenyloxy group. The alkoxy group may be, for example, methoxy, ethoxy, propoxy or the like, and the akenyloxy group may be, for example, isopropenyloxy or isobutenyloxy. In the present invention, the X is preferably a methoxy group or an isopropenyloxy group.

The fluorine-containing group $R_f$ is a divalent perfluoroalkylene group or a divalent perfluoroalkylether group. The divalent perfluoroalkylene group preferably has 4 to 8 carbon atoms, and particularly preferably includes $-C_4F_6-$ or $-C_6F_{12}-$. The divalent perfluoroalkylether group preferably has 6 to 100 carbon atoms, and particularly preferably includes the groups as shown below:

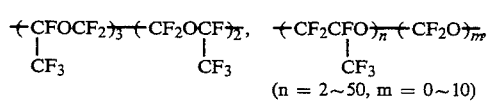

(n = 2~50, m = 0~10)

-continued

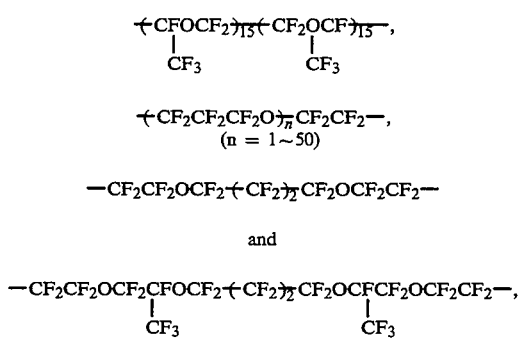

Further, the Q is a siloxane group expressed by the formula (2). The monovalent unsubstituted or substituted hydrocarbon groups $R^3$ and $R^4$ in the formula (2) includes, for example, the groups exemplified for the $R^1$. $R^3$ and $R^4$ are each preferably a hydrocarbon group having 1 to 8 carbon atoms and most preferably a methyl group, a phenyl group or 3,3,3-trifluoropropyl group.

Furthermore, in the general formula (1) the a is an integer of at least 1, and is preferably such an integer as to give the fluorine-containing organosilicon compound a viscosity at 25° C. in the range of 25 to 500,000 cSt, particularly 1,000 to 100,000 cSt. If the viscosity is lower than 25 cSt, the resulting cured product is liable to be unsatisfactory in such a characteristic as mechanical strength. If it is more than 500,000 cSt, processability of the compound tends to be lowered.

Further, the b is the number of functional groups at both terminal ends of the molecular chain and is necessary to be 2 or 3 so that the fluorine-containing organosilicon can impart proper room temperature curability to the composition.

The fluorine-containing organosilicon compound can be produced for example, by reacting a perfluoro compound having a methyl ester linkage at both terminal ends expressed by the following general formula (3):

(3)

wherein $R_f$ is as defined above, a disiloxane having an amino group at both terminal ends expressed by the following general formula (4):

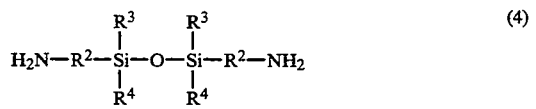
(4)

wherein $R^2$ $R^3$ and $R^4$ are as defined above, and an amino group-containing alkoxysilane expressed by the following general formula (5):

(5)

wherein $R^1$ $R^2$ X and b are as defined above. As for quantities of the compounds provided for the reaction, when the quantities of the compounds expressed by the general formulas (3), (4) and (5) are assumed to be x mol, y mol and z mol, respectively, it is preferred that they satisfy the following relations:

$$x > y,$$

$$x/(x-y) = a \text{ and}$$

$$z = c(x-y)$$

wherein a is as defined above and c is a number from 1.2 to 2.0. The reaction temperature is preferably 20° C. to 80° C., particularly 20° C. to 60° C., and a suitable solvent can be used to conduct the reaction uniformly.

OTHER COMPONENTS

For reinforcement, extending or the like, to the curable composition of the present invention, it is possible to add a filler in an amount of not more than 500 parts by weight, preferably 10 to 100 parts by weight, per 100 parts by weight of the above fluorine-containing organosilicon compound. The filler may be, for example, a reinforcing agent such as fumed silica, precipitated silica, carbon black, titanium dioxide, aluminum oxide, quartz powder, talc, sericite and bentonite; a fibrous filler such as asbestos, glass fiber and organic fibers; or the like.

Furthermore, in order to shorten curing time, it is possible to add to the composition a condensation catalyst as known per se, such as, for example, an organotin compound, e.g., dibutyltin dimethoxide, dibutyltin diacetate, dibutyltin dioctoate, dibutyltin dilaurate, dimethyltin dimethoxide, dimethyltin diacetate and the like; and an organotitanium compound, e.g., tetrapropyltitanate, tetrabutyltitanate, tetra-2-ethylhexyltitanate, dimethoxytitanium diacetylacetonate and the like. The amount of such a condensation catalyst to be added may be a so-called catalytic amount and may be, for example, 0.01 to 2.0 parts by weight per 100 parts by weight of the fluorine-containing organosilicon compound.

Further, the composition may optionally contain an oil-resistance improver such as potassium methacrylate; a colorant; a heat-resistance improver such as red oxide or cerium oxide; a cold-resistance improver; a thixotropy agent such as polyether; a dehydrating agent; an adhesion improver such as γ-aminopropyltriethoxysilane; and the like. These additives may be used in an amount such that they do not impair the object of the present invention, that is, to provide a cured product excellent in all of the solvent resistance, chemical resistance, heat resistance and cold resistance.

CURABLE COMPOSITION

The curable composition of the present invention is prepared as a one-part type room temperature curable composition by mixing uniformly above-described components in prescribed amounts in a dry atmosphere.

When the curable composition is exposed to the atmosphere, a cross-linking reaction by hydrolysiscondensation proceeds due to the atmospheric moisture to form a cured product of rubber-like elastomer. Since the fluorine-containing organosilicon compound, the base component of the curable composition, contains a large amount of fluorine, the resulting cured product is excellent in all of the characteristics of solvent resistance, chemical resistance, heat resistance and cold resistance.

Use

The above curable composition is suitable for sealants and coating materials in the civil engineering and construction industries, and is very useful as adhesives and sealants for electric/electronic parts and as a material for FIPG (Formed In Place Gasket) in the automobile industry.

EXAMPLES

Examples of the present invention will now be described below, in which "part(s)" means "part(s) by weight" and "viscosity" means "viscosity measured at 25° C."

EXAMPLE 1

100 g of a polymer which is represented by the following formula:

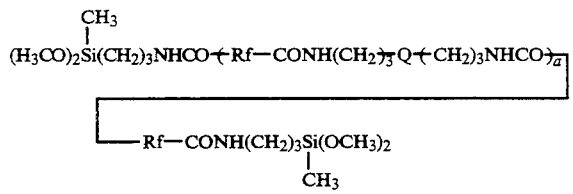

wherein a is 4, $R_f$ is the group having the following formula:

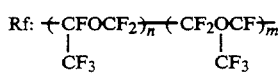

where m+n is 30 on an average, and Q is the group having the following formula:

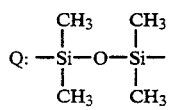

and which has a viscosity of 19,000 cP and a methoxy group content of 0.015 mol per 100 g of the polymer, was mixed with 20 g of MT carbon and passed once through a three-roll mill to obtain Composition I.

The Composition I was formed into a sheet 2 nun thick and allowed to stand in the atmosphere of 20° C. and 55 % RH for 14 days to be cured to form a rubber-like elastomer. Meanwhile, the Composition I is stable at a room temperature under hermetically sealed conditions for 6 or more months. After the elapse of 6 months, Composition I was formed into a sheet 2 mm thick, which was cured under the same conditions as described above to form a rubber-like elastomer. Each of the elastomers thus obtained by curing Composition I immediately after the preparation or 6 months after the preparation was tested for rubber properties according to JIS C. 2123. The results are given in Table 1.

TABLE 1

|  | Cured immediately after preparqation | Cured 6 months after preparation |
| --- | --- | --- |
| Hardness (JIS A)* | 40 | 37 |
| Tensile strength (kgf/cm²) | 21 | 22 |

TABLE 1-continued

|  | Cured immediately after preparqation | Cured 6 months after preparation |
| --- | --- | --- |
| Elongation (%) | 290 | 320 |

*JIS A herein means that hardness was measured using a Type A spring hardness tester according to JIS K 6301.

EXAMPLE 2

Composition II was obtained by mixing 100 g of the same polymer as used in Example 1 with 20 g of MT carbon, 2 g of fumed silica, 0.3 g of dibutyltin dilaurate, 2 g of vinyltrimethoxysilane and 1 g of γ-aminopropyl-triethoxysilane and then by passing the mixture once through a three-roll mill. The Composition II was cured in the same manner as in Example 1 to obtain a rubber-like elastomer. The resulting elastomer was tested for rubber properties in the same manner as in Example 1.

The results are given in Table 2.

TABLE 2

|  | Cured immediately after preparation | Cured 6 months after preparation |
| --- | --- | --- |
| Hardness (JIS A) | 37 | 35 |
| Tensile strength (kgf/cm²) | 22 | 24 |
| Elongation (%) | 230 | 260 |

Furthermore, cured products from Compositions I and II prepared in the above Examples were tested for solvent resistance, chemical resistance, heat resistance and cold resistance. The results are given in Tables 3, 4, 5 and 6, respectively.

TABLE 3

| | Solvent resistance | | |
| --- | --- | --- | --- |
| | Volume change ΔV (%) | | |
| | Composition I | Composition II | Fluoro-rubber |
| Toluene | 6 | 11 | 8 |
| n-Hexane | 11 | 14 | 1 |
| Methanol | 6 | 4 | 92 |
| Methyl ethyl ketone | 15 | 16 | 240 |

Remarks:
Testing conditions: Volume change was evaluated after dipping a cured product in each solvent at 25° C. for 7 days. For comparison, a fluororubber (Trade name: Viton E-60° C., product by Du Pont) was also tested in the same manner.

TABLE 4

| | Chemical resistance | | |
| --- | --- | --- | --- |
| | Volume change ΔV (%) | | |
| 10% Aqueous solution of | Composition I | Composition II | Silicone rubber |
| NaOH | 0 | 0 | 0 |
| HCl | 0 | 0 | 2 |
| HNO₃ | 0 | 1 | 8 |
| H₂SO₄ | 0 | 1 | 5 |

Remarks:
Testing Conditions: Volume change was evaluated after dipping a cured product in an aqueous solution of each chemical at 25° C. for 7 days. For comparison, a room temperature curable silicone rubber (Trade name:

KE-951, product by Shin-Etsu Chemical Co., Ltd.) was also tested in the same manner.

TABLE 5

| | Heat resistance | | | |
|---|---|---|---|---|
| | Composition I | | Composition II | |
| | Initial* | After** heating at 200° C. for 120 hours | Initial* | After** heating at 200° C. for 120 hours |
| Hardness (JIS A) | 40 | 42 | 37 | 40 |
| Elongation (%) | 290 | 280 | 230 | 210 |
| Tensile strength (kgf/cm$^2$) | 21 | 22 | 22 | 25 |
| Weight loss on heating (%) | — | 0.5 | — | 0.4 |

Remarks:
*Initial properties of a cured product.
**Properties of a cured product after aging at 200° C. for 120 hours.

Remarks: * Initial properties of a cured product.
** Properties of a cured product after aging at 200° C. for 120 hours.

TABLE 6

| | Cold resistance | |
|---|---|---|
| | Composition I | Composition II |
| T$_2$ | −46° C. | −45° C. |
| T$_5$ | −49° C. | −48° C. |
| T$_{10}$ | −54° C. | −52° C. |
| T$_{100}$ | −60° C. | −57° C. |

Remarks:
Cold resistance test was conducted according to the following method:

A Gehman torsion tester made by Ueshima Seisakusho was used. A test specimen was cooled in a dry ice/ethanol mixture to −70° C. It was then heated at a rate of 1° C./min, while the modulus of torsion was measured at temperatures. The temperatures at which the modulus of torsion reached a value 2, 5, 10 and 100 times, respectively, that at room temperature, was denoted as T$_2$, T$_5$, T$_{10}$ and T$_{100}$, respectively.

What is claimed is:

1. A room temperature curable composition comprising a fluorine-containing organosilicon compound represented by the following general formula (1):

$$X_bSi-R^2-NHCO(Rf-CONH-R^2-Q- \quad (1)$$
$$R^1_{3-b}$$

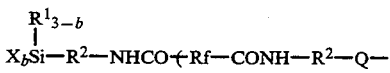

-continued $$-R^2-NHCO)_{\overline{a}}Rf-CONH-R^2-SiX_b$$
$$R^1_{3-b}$$

wherein a is an integer of at least 1, b is 2 or 3, R$^1$, which may be the same or different where plural R$^1$ are present, is a monovalent unsubstituted or substituted hydrocarbon group, the plural R$^2$ may be the same or different and are each a divalent unsubstituted or substituted hydrocarbon group, the plural X may be the same or different and are each an alkoxy group or an alkenyloxy group, the plural Rf may be the same or different and are each a divalent perfluoroalkylene group or a divalent perfluoroalkylether group, and Q is a siloxane group expressed by the following formula (2):

$$\begin{array}{cc} R^3 & R^3 \\ | & | \\ -Si-O-Si- \\ | & | \\ R^4 & R^4 \end{array} \quad (2)$$

where the plural R$^3$ and R$^4$ may be the same or different and are each a monovalent unsubstituted or substituted hydrocarbon group.

2. The composition of claim 1, wherein in the general formula (1) R$^1$ is selected from the group consisting of a methyl group, a phenyl group and the 3,3,3-trifluoropropyl group.

3. The composition of claim 1, wherein in the general formula (1) R$^2$ are each the ethylene group or the propylene group.

4. The composition of claim 1, wherein in the general formula (1) said plural X are each the methoxy group or the isopropenyloxy group.

5. The composition of claim 1, wherein in the general formula (1) said plural Rf are each a perfluoroalkylene group having 4 to 8 carbon atoms.

6. The composition of claim 1, wherein in the general formula (1) said plural Rf are each a divalent perfluoroalkylether group having 6 to 100 carbon atoms.

7. The composition of claim 1, wherein said fluorine-containing organosilicon compound has a viscosity at 25° C. in the range of 25 to 500,000 cSt.

8. The composition of claim 1, which further comprises a filler.

9. The composition of claim 1, which further comprises a condensation catalyst.

10. A cured product obtained by curing the composition as claimed in claim 1.

* * * * *